April 25, 1961 S. H. JACKSON 2,981,920
CABLE CLAMP
Filed March 16, 1959
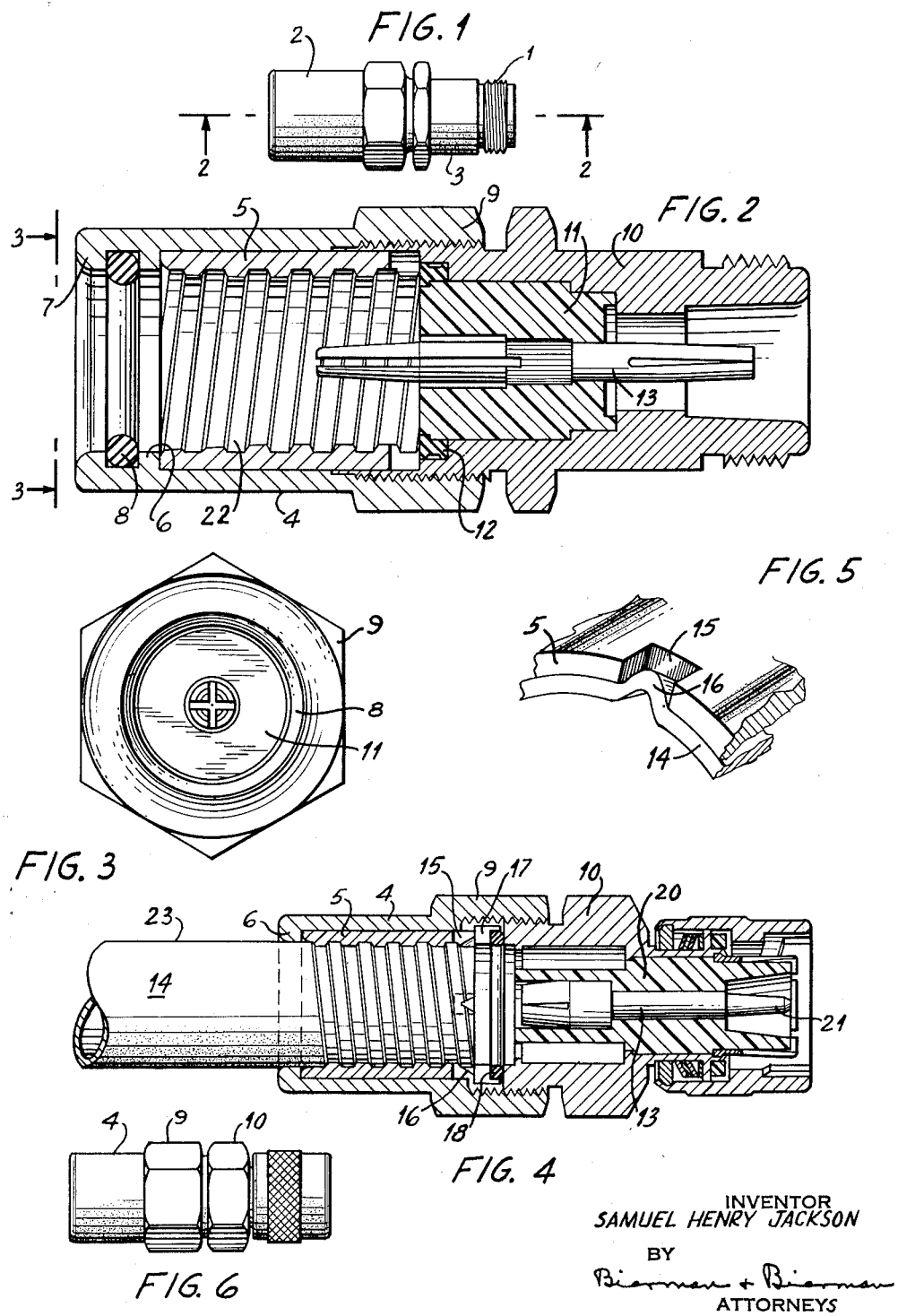
INVENTOR
SAMUEL HENRY JACKSON
BY
Bierman + Bierman
ATTORNEYS United States Patent Office 2,981,920
Patented Apr. 25, 1961

2,981,920
CABLE CLAMP
Samuel Henry Jackson, Ardsley, N.Y., assignor to Kings Electronics, Inc., a corporation of New York
Filed Mar. 16, 1959, Ser. No. 799,522
2 Claims. (Cl. 339—89)

The present invention is directed to an improved form of cable clamp, more specifically to a simple, easily installed clamp particularly designed for use in connection with coaxial cable.

In the past cables have been clamped by various means, which usually have been cumbersome and unwieldy. Furthermore the requirements of care and skill in putting on the clamps of the prior art were such that a careless workman was likely to either damage the cable or the clamp or have great difficulty in getting the parts to properly mate.

It is among the objects of the present invenition to provide a simple cable clamp of rugged construction.

It is also among the objects of this invention to provide a cable clamp which may be attached simply and easily with a minimum of skilled work required.

It is further among the objects of this invention to provide a cable clamp which will firmly grip the cable and be capable of withstanding substantial tensile loads without slipping.

It is still further among the objects of this invention to provide a cable clamp which can simply and easily be locked in place so that it is incapable of any movement.

In carrying out the aforementioned objects, there is provided a cylindrical casing having an internal flange at one end thereof. A gripping ring is positioned within the cylindrical casing and in contact with the casing and the flange. On the inner surface of the gripping ring are internal deforming surfaces and the ring is of such size as to cause these surfaces to bear strongly against the sheath of the cable to be clamped.

The cable upon which the clamp is mounted has a distortable metal surface or sheath which is clamped in and distorted by the ring.

The cable may extend beyond the end of the ring remote from the flange and the other end of the casing may be internally threaded and adapted to receive a complementary cable connector externally threaded to engage said internal threads.

In the preferred form of this invention the gripping ring is provided with a plurality of circumferentially spaced areas at the end thereof remote from the flange. Portions of the distortable cable sheath are flared into the spaced areas in order to lock the entire assembly in place. As in the first described form of this invention, the cylindrical casing surrounds the gripping ring and contacts it both at the internal flange and at the internal surface of said casing. In addition, either of the two embodiments described may be provided with an O ring which seals off the unit and permits the maintenance of a hermetic seal.

In the accompanying drawings constituting a part hereof and in which like reference characters indicate like parts, Fig. 1 is an external view of the present invention coupled to one form of cable connector;

Fig. 2 is a section along lines 2—2 of Fig. 1;

Fig. 3 is a view as indicated on line 3—3 of Fig. 2;

Fig. 4 is a view similar to that of Fig. 2 showing the preferred form of clamp engaging a somewhat different type of cable connector than that shown in Fig. 2;

Fig. 5 is an enlarged fragmentary perspective view showing one of the flares which lock the gripping ring in place, and Fig. 6 is an external view of the device as shown in Fig. 4.

Referring more specifically to Figs. 1 and 2, cable clamp and coupling 1 is composed of clamp 2 and connector 3. Clamp 2 comprises casing 4 having flange 6 projecting internally thereof and abutting the rear end of gripping ring 5. O ring 8 is contained within casing 4 between flange 6 and portion 7. Ring 5 carries deforming surfaces 22 of helical form on the inside thereof. Casing 4 carries internally threaded portion 9 on its end remote from flange 6. Complementary connector 3 is externally threaded to engage casing 4. In the form of complementary connector shown, insulators and spacers 11 and 12 are provided to hold center contact 13 within body 10 of the connector 3.

In the preferred form of this invention, cable 23 having deformable sheath 14 is clamped in ring 5. Casing 4 surrounds and contacts said ring and is provided with the flange 6 which abuts one end of ring 5. Internally threaded portion 9 of casing 4 engages a complementary member in a manner similar to that shown in Fig. 2. Gripping ring 5 has circumferentially spaced notches 15 at the end thereof remote from flange 6. Flares 16 formed on the cable project into said spaced notches, locking gripping ring 5 in place. There is also provided seat 17 for O ring 18 placed between the end of gripping ring 5 remote from flange 6 and the face of the complementary connector.

The form of complementary connector shown in Fig. 4 comprises a body 10, spacing and insulating elements 20, which serve to hold in place center contact 13, terminating in male contact 21.

In assembling the clamp of the present invention, gripping ring 5 is turned onto cable 23, deforming surface 14 of the cable in the process. Next, a cutting tool is provided which fits and rides on gripping ring 5 and cuts off the cable at precisely the desired point in relation thereto. Casing 4 is slipped onto the cable prior to putting on gripping ring 5 and is now moved forward until flange 6 engages one end of ring 5. By means of a staking tool, flares 16 are formed outwardly from portions of sheath 14 of cable 23 into circumferentially spaced areas 15 (as shown in Fig. 5). O ring seat 17 is then placed against the cable 23 abutting the end of ring 5 remote from flange 6 and O ring 18 placed thereon. The complementary coupling is then threaded into casing 4. This serves to retain the O ring and all parts in a precisely spaced relationship.

It is apparent that the subject matter of the present application may be used in connection with any form of connector or for that matter any device which is desired to be secured to the end of a cable. The only requirements are that a device to be attached to the clamp be threaded in accordance with the threads on the casing of the clamp itself.

While only two specific embodiments of this invention have been described, nevertheless changes which would be apparent to one skilled in the art may be made without departing from the spirit thereof and this invention is to be broadly construed and not to be limited except by the claims appended hereto.

What is claimed is:
1. A cable clamp comprising, a cylindrical casing provided with an internal flange at one end, a gripping ring located within the casing and having one end in contact with the flange, said gripping ring being provided with internal cable-deforming surfaces, the gripping ring being provided at one end with a plurality of spaced notches, a cable extending axially through the gripping ring, said cable having a deformable metal sheath that is clamped in and deformed by the gripping ring, the metal sheath of the cable being provided with a plurality of spaced outwardly-protruding flares engaging with the notches in the gripping ring, the casing having internal threads at its end remote from the flange, and a cable connector having external threads engaged by the internal threads on the casing.

2. A cable clamp comprising, a cylindrical casing provided at one end with an internal annular flange, said flange being formed with an annular groove, a sealing ring fitted within said groove, a gripping ring extending concentrically through the casing and having one end contacting the flange inwardly of the sealing ring, said gripping ring having internal helical cable-deforming surfaces, the gripping ring being provided at its forward end with a plurality of spaced notches, a cable extending axially through the gripping ring, said cable having a deformable metal sheath embraced by the gripping ring and deformed by the helical surfaces thereof, the end of the metal sheath being outwardly distorted at points in register with the notches in the gripping ring to provide protuberances in said sheath that extend radially outward into the notches, the casing being threaded at its end remote from the flange, and a cable connector having threads engaged by those on the casing.

References Cited in the file of this patent
UNITED STATES PATENTS

| | | |
|---|---|---|
| 1,882,856 | Meuer | Oct. 18, 1932 |
| 2,076,072 | Douglas | Apr. 6, 1937 |
| 2,258,737 | Browne | Oct. 14, 1941 |